3,261,788
DISPERSION POLYMERIZATION OF MONOMER IN PRESENCE OF BLOCK OR GRAFT COPOLYMER AND FILM-FORMING RESIN
Ronald James Carter, Slough, Richard Henry Cousens, Gerrards Cross, and Desmond Wilfrid John Osmond, Iver Heath, England, assignors to Imperial Chemical Industries Limited, London, England, a corporation of Great Britain
No Drawing. Filed Dec. 16, 1960, Ser. No. 76,116
Claims priority, application Great Britain, Dec. 18, 1959, 43,048/59
6 Claims. (Cl. 260—4)

This invention relates to dispersions of modified synthetic polymers in organic liquid.

We have previously found that we can provide stable dispersions of synthetic polymers in organic liquid characterised in that stabilising solvatable groups are attached by primary chemical bonds to molecules forming an integral part of the disperse particles. This is in contrast to the use of conventional stabilising agents, in which the stabilising solvatable groups become indirectly attached to the disperse particles through groups which themselves are merely adsorbed on to the surface of the disperse particles by second order forces.

By solvatable group is meant a group solvated by the organic liquid in which the polymer is dispersed.

One method of incorporating the solvatable groups in the disperse particle is to precipitate the polymer in organic liquid in the presence of a block or graft copolymer of which one constituent is solvated by the organic liquid, and another constituent is compatible with, and is co-precipitated with, the polymer. This co-precipitation results in the compatible constituent becoming inextricably entangled with the precipitated polymer chains and hence becoming an integral part of the particle. The solvatable constituent is thus irreversibly attached to the disperse particle through the primary chemical bonds of the block or graft copolymer. This procedure may be carried out, for example, by precipitating a preformed polymer from solution or by forming the polymer in an organic liquid in which it is insoluble. The block or graft copolymer may be added as such or may be formed in situ during the formation of the polymer to be dispersed.

Another method is by direct attachment of the solvatable groups at infrequent intervals to the chains of the polymer to be dispersed. This direct attachment to the polymer molecules by primary chemical bonds results in a polymer which is self-stable and precipitates in the form of a stable dispersion. Precipitation may be concurrent with the formation of the stable polymer in a non-solvent, or the polymer may be made in solution and subsequently precipitated. This method of incorporating the solvatable groups in the polymer by primary chemical bonds may be effected during polymerisation by carrying out the polymerisation in the presence of a compound comprising the solvatable group and an unsaturated group which can enter into the polymerisation, or the solvatable groups may be attached to active groups in the polymer after it has been formed in solution.

It is often desirable to incorporate in dispersed synthetic polymers a modifier such as a plasticiser or a compatible polymeric material. This is particularly the case when the dispersion is to be used in a coating composition and it is desired, in addition to pigmenting the dispersion, to modify the characteristics of the coating film produced from the dispersion, e.g. in respect of hardness, flexibility, weathering, petrol resistance, etc.

If a homogeneous coating film is to be formed from the polymer dispersion, the modifier should, of course, be compatible with the polymer. If its affinity to the polymer is such that it is compatible, then it also may be insoluble, as is the polymer, in the organic liquid; indeed it may be preferable, in order to simplify the mechanism of forming a film from the disperse particles, that in the dispersion the modifier should be located in the disperse particles and not in the organic liquid, i.e. it should be insoluble in the latter.

This requirement of insolubility in the organic liquid leads to difficulties in incorporating the modifier in the dispersion. Even if the modifier can be brought into intimate contact with the disperse polymer particles the rate of diffusion into the polymer at temperatures below the second-order transitional temperature is very slow and the formation of a highly modified layer on the outside of the polymer particles may lead to masking of the stabilising groups and coagulation of the dispersion.

We have now found that in the preparation of a dispersion of modified synthetic polymer in an organic liquid a modifier insoluble in the organic liquid continuous phase may be incorporated in the disperse polymer particles by co-precipitating the polymer and the modifier in the organic liquid.

Where the dispersion is made by simultaneous polymerisation and precipitation in the continuous phase of the dispersion, the modifier may be initially dissolved in the monomer/continuous phase mixture and then, as the monomer content of this mixture decreases on conversion to polymer and the solvency power of the mixture correspondingly decreases, the modifier is taken up in the polymer as it is formed and thus incorporated in the disperse particles. Where a drip feed of monomer is to be used, the modifier may be dissolved in the monomer and the solution fed into the reaction vessel.

Alternatively, where the dispersion is made by precipitating a preformed polymer from a solution the modifier may be dissolved in the polymer solution from which it is subsequently precipitated simultaneously with the polymer.

In the case of a polar synthetic polymer such as polymethyl methacrylate stabilised with solvatable groups derived from degraded natural rubber and dispersed in a non-polar solvent such as an aliphatic hydrocarbon, suitable plasticisers would include highly polar but low molecular weight materials such as dimethyl phthalate and high molecular weight polymeric esters such as benzoic acid-terminated glycol sebacate and lauric acid-terminated glycol adipate. Suitable compatible film-forming modifiers include short oil alkyd resins, for example, 20% oil length lauric acid-modified glyceryl phthalate, epoxy resins and aminoplasts or nitrogen resins, for example, urea formaldehyde, melamine formaldehyde and benzoguanidine formaldehyde.

In the case of a non-polar synthetic polymer such as polystyrene stabilised with groups derived from acrylic acid and dispersed in a polar solvent such as ethanol, a suitable plasticiser would be an alkyl naphthalene, a halo-naphthalene, a halodiphenyl or a halo paraffin wax, a suitable halogen substituent being chlorine.

The disperse polymer to be modified may be a homopolymer or copolymer but is referred to throughout this specification as polymer.

Typical polymers include those of styrene, vinyl toluene, divinyl benzene, diisopropenyl benzene, allyl acetate, diallyl adipate, acrylonitrile, vinyl chloride, vinylidene chloride, vinyl propionate, vinyl acetate, vinyl stearate and acrylates and methacrylates of aliphatic alcohols such as ethyl, octyl, lauryl and natural fat alcohols. Preferred monomers for use in the production of polymers are methyl methacrylate, β-ethoxy ethyl methacrylate, ethyl acrylate, vinyl acetate, acrylonitrile, methacrylic acid and acrylic acid, and amides of these acids. Combinations of the above monomers may be used and other typical materials which are suitable for use as co-monomers include dimethyl itaconate, diethyl maleate, maleic anhydride, and allyl alcohol.

Where the polymer dispersion is to be used as a coating composition it may be pigmented.

The invention is illustrated by the following examples in which parts are by weight.

*Example I*

A polymer dispersion was prepared by heating at 85° C. a mixture of 1500 parts of methyl methacrylate, 3000 parts of white spirit (petroleum hydrocarbon boiling substantially in the range 155–195° C.), 40 parts of degraded rubber (reduced viscosity in benzene ≡0.7) and 3 parts of benzoyl peroxide in a reactor equipped with stirrer, cooling coil, thermometer, heating jacket and condenser venting to atmosphere. After 5 hours the polymerisation was complete and the milky dispersion was cooled and removed from the reactor.

An attempt was made to plasticise the disperse polymer to a polymer/plasticiser ratio of 100/33 using the white spirit-insoluble plasticiser dimethyl phthalate. On simple mixing, the latex rapidly thickened and coagulated.

The attempt was repeated using an improved technique in which the plasticiser was added very slowly to the well-stirred dispersion. It was found possible to incorporate all the plasticiser without coagulation, but on storing for 48 hours the dispersion thickened and gradually gelled.

The preperation of the dispersion was repeated with the addition of 500 parts of dimethyl phthalate to the initial charge, in which it was soluble. The reaction proceeded normally and a satisfactory dispersion formed which had a storage stability of greater than 3 months.

*Example II*

Example I was repeated using a white spirit-insoluble polymeric ester plasticiser, a lauric acid-terminated polypropylene glycol adipate in place of dimethyl phthalate. Similar results were obtained in all cases.

*Example III*

A non-aqueous dispersion containing plasticiser was prepared as follows.

3000 parts of white spirit, 30 parts of degraded rubber and 10 parts of benzoyl peroxide were heated to 80° C. in the apparatus of Example I. A solution of 330 parts of dimethyl phthalate in 1000 parts of methyl methacrylate was dripped into the reactor over a period of 4 hours and then the cooking continued for a further half hour. The product was cooled and filtered free from slight fibrous coagulum to yield an excellent product having excellent storage stability.

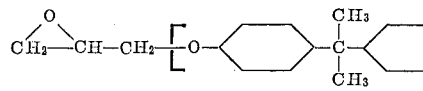

*Example IV*

Example III was repeated using in place of the dimethyl phthalate a white spirit-insoluble polyester plasticiser. Similar results were obtained.

*Example V*

The following charge was placed in a 3-litre glass reactor equipped with a heating jacket, stirrer and reflux condenser:

| | Parts by weight |
|---|---|
| Styrene | 500 |
| Ethyl alcohol | 1000 |
| Chlorinated paraffin wax (containing 42% combined chlorine) | 250 |
| Benzoyl peroxide | 7 |
| Polyacrylic acid (reduced viscosity in acetone of 2.8) | 25 |

It was heated to reflux and maintained for four hours after which time a silvery white, stable dispersion of plasticised polystyrene had been formed.

*Example VI*

The following ingredients were charged to a glass reactor equipped with stirrer, heating and cooling jackets, thermometer, monomer inlet and inlet gas line:

| | Parts by weight |
|---|---|
| Petroleum ether (boiling range 100–120° C.) | 700 |
| Benzoyl peroxide | 67 |
| Degraded natural rubber | 10 |

Inert gas was fed into the reactor and the temperature of its contents raised to 50° C.

Into this hot mix was dripped, over 1½ hours, a mixture of the following:

| | Parts by weight |
|---|---|
| Methyl methacrylate | 100 |
| Ethyl acrylate | 80 |
| Methacrylic acid | 20 |
| Penta-ethyl ether of hexamethylol melamine | 50 |
| Benzoyl peroxide | 50 |

Reaction was substantially complete approximately half an hour after the end of the feed, a stable, fluid, fine particle size dispersion being formed. Films cast from the dispersion and dried at 70° C. were soft, clear and solvent-sensitive, but became hard, tough and solvent-resistant on baking at 150° C.

*Example VII*

In apparatus similar to that used in Example VI was charged:

| | Parts by weight |
|---|---|
| Petroleum ether (boiling range 40–60° C.) | 1000 |
| White spirit | 400 |
| Benzoyl peroxide | 80 |
| Degraded rubber | 20 | and heated to its reflux temperature of about 60° C. Down the reflux condenser was added, over 2 hours, a mixture of:

| | Parts by weight |
|---|---|
| Methyl methacrylate | 200 |
| β-ethoxy ethyl methacrylate | 160 |
| Glycol mono-methacrylate | 40 |
| "Epikote" 828 epoxy resin [1] | 100 |
| Benzoyl peroxide | 80 |

[1] A bis-phenol A-epichlorhydrin condensate having the formula

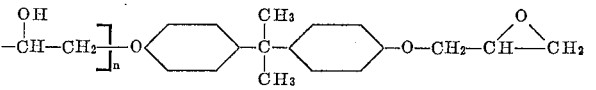

A stable, fluid dispersion was formed, which, 30 minutes after the end of the feed, was concentrated by vacuum distillation to a solids content of about 50%. At no time during the distillation did the temperature rise above 60° C.

1% of a high boiling amine was added as catalyst to the dispersion and on stoving a cast film for 1 hour at 150° C., a hard, tough, solvent-resistant film was produced.

What we claim is:

1. In a process for producing a stable dispersion of a solid addition polymer in an inert organic liquid in which the polymer is insoluble which comprises polymerizing at least one ethylenically unsaturated monomer dissolved in said organic liquid in the presence of a member of the group consisting of organic block and graft copolymers of which one polymeric constituent is compatible with, and is co-precipitated with, the polymer and another polymeric constituent is solvated by the organic liquid and stabilizes the polymer dispersion; the improvement which comprises carrying out the polymerization in the presence of, in addition to said copolymer, a compatible film-forming resin, said resin being present in an amount which normally would be insoluble in the organic liquid alone but is dissolved by the monomer being polymerized, and continuing the polymerization to co-precipitate the resin with the polymer as the monomer is used up in the formation of said polymer and thereby obtaining a stable dispersion of the modified polymer in the organic liquid.

2. A process as claimed in claim 1 in which the resin is dissolved in the monomer and gradually added to the organic liquid during the course of the polymerization.

3. A process as claimed in claim 1 in which the polymer comprises polymethyl methacrylate and the solvatable polymeric constituent is derived from degraded natural rubber.

4. A process as claimed in claim 3 in which the resin is a 1,2-epoxy resin.

5. A process as claimed in claim 3 in which the resin is an aminoplast.

6. A stable dispersion of modified polymer in organic liquid prepared by a process claimed in claim 1.

References Cited by the Examiner
UNITED STATES PATENTS 3,095,388  6/1963  Osmond et al. _____ 260—4

FOREIGN PATENTS 690,937  4/1953  Great Britain.
1,093,992  12/1960  Germany.

MURRAY TILLMAN, *Primary Examiner.*

DANIEL ARNOLD, LEON J. BERCOVITZ, WILLIAM H. SHORT, *Examiners.*

J. W. SANNER, G. F. LESMES, *Assistant Examiners.*